Oct. 11, 1932.　　　A. W. TRONNIER　　　1,882,530
SPHERICALLY CHROMATICALLY AND ASTIGMATICALLY CORRECTED
WIDE ANGLE LENS WITH HIGH APERTURE
Filed Oct. 1, 1930
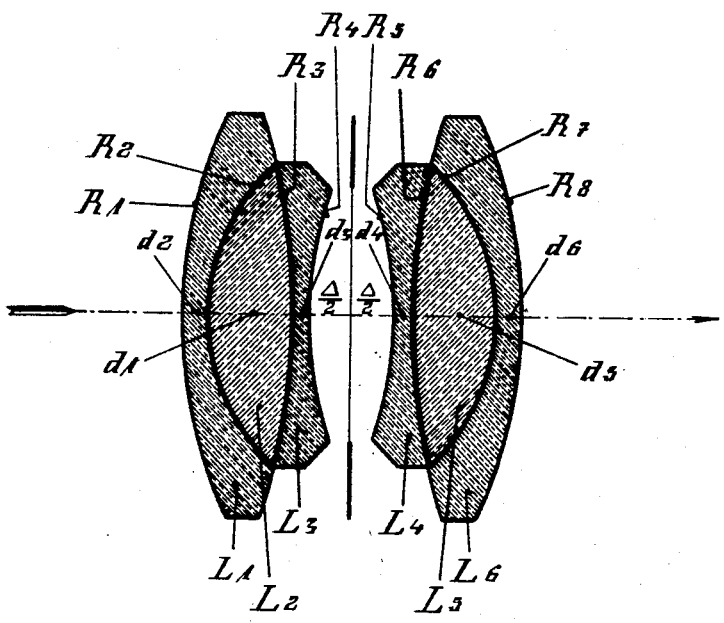
Inventor:
A. W. Tronnier.
by Hans Hederich
Attorney.

Patented Oct. 11, 1932

1,882,530

UNITED STATES PATENT OFFICE

ALBRECHT WILHELM TRONNIER, OF KREUZNACH, GERMANY

SPHERICALLY CHROMATICALLY AND ASTIGMATICALLY CORRECTED WIDE-ANGLE LENS WITH HIGH APERTURE

Application filed October 1, 1930, Serial No. 485,596, and in Germany July 2, 1930.

This invention relates to a modification of the double-objectives composed of two components consisting each of three lenses and being corrected spherically, chromatically and astigmatically, the lenses of each of said two components having three concave radii of curvature directed towards the diaphragm, and the two hollow faces located adjacent the diaphragm having a dispersing effect, whereas the third hollow face, as well as the cementing radius directed towards the diaphragm, has a collecting effect. Of this kind of photographic double objectives the present invention relates to such constructional forms in which the indexes of refraction of the glasses, always counted in the direction from the diaphragm, have increasing values and the last lens on the outer side is a meniscus negative lens.

Objectives of this latter kind permit, on account of their outer meniscus lenses, the attainment of a particularly favorable proportion between the lens diameters and the total length of the objective whereby also with a relatively high aperture the blending down of the passing oblique rays with strong inclination can be obviated, although the total length of such objectives strongly increases with the relative opening.

The objectives designed according to this invention are distinguished by the characteristic features, that the difference in the indices of refraction of the lenses bounding the collecting cemented surface is greater than 0.08 and that the difference in the refractive indices at the dispersing cemented surface is greater than $\frac{1}{4}$ of the difference at that cemented surface which is convex towards the diaphragm, and that, furthermore, the dispersing cemented radius amounts at least to 7.5% but at the highest to 15%, and, finally, the other, collecting cemented radius amounts at least to $\frac{1}{3}$, but at the highest to $1\frac{1}{20}$ of the equivalent focal length of the objective.

Investigations have disclosed the fact that particularly high apertures can be attained if, besides the above-stated conditions, for that dispersing lens which is located adjacent the diaphragm a glass with very low refraction is used, that is to say, the index of refraction of which for the yellow light is smaller than 1.49. It has also been discovered that the comatic aberrations with the constructional forms with high aperture can be reduced by making at least one element of correction of the rear component deviates from the proportionality with respect to the corresponding element of correction of the front-component.

In order to make my invention more clear, I refer to the accompanying drawing in which is shown diagrammatically and by way of example a wide-angle lens with high aperture designed according to this invention. This constructional form is designed for an equivalent focal length of 200 mm. and the designations in the figure correspond with those used in the numerical example dealt with hereinafter. Thus, R denotes the radii, $d$ the thicknesses of the lenses, and $\frac{\Delta}{2}$ the distances between the individual cemented components and the diaphragm B. The utilizable diameter of the menisci on the outer side of this objective which is corrected for the relative aperture of 1:6.8 amounts to 20% of the focal distance at a total length of 17.488% of the same which, in the numerical example, is put as equal to the unity.

In the constructional form shown by way of example the lenses are built up quasi-holosymmetrically, in that two elements of correction, viz. the thickness $d_6$ and the radius R8, show the deviation form the proportionality according to this invention.

| Radii | Thicknesses | Distances |
|---|---|---|
| R1=+0.23395 | $d_1$=0.01197 | |
| R2=+0.09956 | $d_2$=0.03961 | |
| R3=−0.41436 | $d_3$=0.01153 | |
| R4=+0.20718 | | |
| | $\Delta$=0.04050 | $\frac{\Delta}{2}+\frac{\Delta}{2}$ |
| R5=−0.20718 | $d_4$=0.01153 | |
| R6=+0.41436 | $d_5$=0.03961 | |
| R7=−0.09956 | $d_6$=0.02013 | |
| R8=−0.22376 | | |

Kinds of glasses

| | | |
|---|---|---|
| L1 | $n_D = 1.6035$ | $\nu = 38.0$ |
| L2 | $n_D = 1.5715$ | $\nu = 50.8$ |
| L3 | $n_D = 1.4631$ | $\nu = 64.9$ |
| L4 | $n_D = 1.4631$ | $\nu = 64.9$ |
| L5 | $n_D = 1.5715$ | $\nu = 50.8$ |
| L6 | $n_D = 1.6035$ | $\nu = 38.0$ |

I claim:

1. In a spherically, chromatically and astigmatically corrected wide-angle lens with high aperture which comprises, in combination with the diaphragm, two individual components consisting each of three lenses cemented together and having three radii of curvature that are concave towards said diaphragm, the two concave surfaces adjacent the diaphragm being adapted to disperse and the third concave surface, as well as that cemented radius which is convex towards the said diaphragm, being adapted to collect, and the glasses being such that their indices of refraction increase in the direction away from the diaphragm, the difference in the indices of refraction of the glasses of the lenses bounding said collecting cemented surface being greater than 0.08, the difference in the refractive indices at the dispersing cemented surface being greater than one fourth of the difference at that cemented surface which is convex towards the diaphragm and the difference of the indices of refraction of the two outer dispersing lenses being smaller than 0.150: individual components, as above stated, in which the collecting cemented radius amounts at least to one third and at the highest to one half of the total focal length of the objective, and the dispersing cemented radius amounts at least to 7.5% and at the highest to 15% of the equivalent focal length of the same.

2. In a spherically, chromatically and astigmatically corrected wide-angle lens with high aperture which comprises, in combination with the diaphragm, two individual components consisting each of three lenses cemented together and having three radii of curvature that are concave towards said diaphragm, the two concave surfaces adjacent the diaphragm being adapted to disperse, and the glasses being such that their indices of refraction increase in the direction away from the diaphragm, the difference in the indices of refraction of the glasses of the lenses bounding said collecting cemented surface being greater than 0.08, the difference in the refractive indices at the dispersing cemented surface being greater than one fourth of the difference at that cemented surface which is convex towards the diaphragm and the difference of the indices of refraction of the two outer dispersing lenses being smaller than 0.150, and the index of refraction of the biconcave element for the yellow light is smaller than 1.49: individual components, as above stated, in which the collecting cemented radius amounts at least to one third and at the highest to one half of the total focal length of the objective, and the dispersing mented radius amounts at least to 7.5% and at the highest to 15% of the equivalent focal length of the same.

3. In a spherically, chromatically and astigmatically corrected wide-angle lens with high aperture which comprises, in combination with the diaphragm, two individual components consisting each of three lenses cemented together and having three radii of curvature that are concave towards said diaphragm, the two concave surfaces adjacent the diaphragm being adapted to disperse, and the glasses being such that their indices of refraction increase in the direction away from the diaphragm, the difference in the indices of refraction of the glasses of the lenses bounding said collecting cemented surface being greater than 0.08, the difference in the refractive indices at the dispersing cemented surface being greater than one fourth of the difference at that cemented surface which is convex towards the diaphragm and the difference of the indices of refraction of the two outer dispersing lenses being smaller than 0.150, and the index of refraction of the biconcave element for the yellow light is smaller than 1.49, and the third concave surface, as well as that cemented radius which is convex towards the said diaphragm, being adapted to collect: individual components, as above stated, in which the collecting cemented radius amounts at least to one third and at the highest to one half of the total focal length of the objective and the dispersing cemented radius amounts at least to 7.5% and at the highest to 15% of the equivalent focal length of the same.

4. In a spherically, chromatically and astigmatically corrected wide-angle lens with high aperture which comprises, in combination with the diaphragm, two individual components consisting each of three lenses cemented together and having three radii of curvature that are concave towards said diaphragm, the two concave surfaces adjacent the diaphragm being adapted to disperse, and the glasses being such that their indices of refraction increase in the direction away from the diaphragm, the difference in the indices of refraction of the glasses of the lenses bounding said collecting cemented surface being greater than 0.08, the difference in the refractive indices at the dispersing cemented surface being greater than one fourth of the difference at that cemented surface which is convex towards the diaphragm and the difference of the indices of refraction of the two outer dispersing lenses being smaller than 0.150, and the index of refraction of the biconcave element for the yellow light is smaller than 1.49, and the third concave surface, as well as that cemented radius which is convex towards the said diaphragm being adapted to collect, and the glasses being such that their indices of refraction increase in the direction away from the diaphragm, and the exterior lens located counter to the diaphragm is a meniscus lens: individual components, as above stated, in which the collecting cemented radius amounts at least to one third and at the highest to one half of the total focal length of the objective, and the dispersing cemented radius amounts at least to 7.5% and at the highest to 15% of the equivalent focal length of the same.

In testimony whereof I affix my signature.

ALBRECHT WILHELM TRONNIER.